(12) United States Patent
Maxfield

(10) Patent No.: US 7,299,243 B2
(45) Date of Patent: Nov. 20, 2007

(54) SYSTEM AND METHOD FOR CONTROLLING FREE SPACE DISTRIBUTION BY KEY RANGE WITHIN A DATABASE

(75) Inventor: John D. Maxfield, Cedar Park, TX (US)

(73) Assignee: BMC Software, Inc., Houston, TX (US)

( * ) Notice: Subject to any disclaimer, the term of this patent is extended or adjusted under 35 U.S.C. 154(b) by 869 days.

(21) Appl. No.: 10/034,438

(22) Filed: Dec. 27, 2001

(65) Prior Publication Data

US 2003/0056082 A1  Mar. 20, 2003

Related U.S. Application Data

(60) Provisional application No. 60/323,412, filed on Sep. 19, 2001.

(51) Int. Cl.
*G06F 17/00* (2006.01)
(52) U.S. Cl. .................... 707/104.1; 707/100
(58) Field of Classification Search ............. 369/53.31, 369/53.11, 53.1, 275.3, 272, 275.1; 709/200, 709/223, 226; 707/1–104.1, 200–206
See application file for complete search history.

(56) References Cited

U.S. PATENT DOCUMENTS

| 4,774,657 | A | * | 9/1988 | Anderson et al. ............... 707/2 |
|---|---|---|---|---|
| 5,649,196 | A | * | 7/1997 | Woodhill et al. ............ 707/204 |
| 5,732,402 | A | * | 3/1998 | Lehman ....................... 707/205 |
| 5,764,593 | A | * | 6/1998 | Turpin et al. .................. 713/2 |
| 5,799,290 | A | * | 8/1998 | Dolan et al. ................. 705/410 |
| 5,852,822 | A | * | 12/1998 | Srinivasan et al. ............ 707/4 |
| 6,003,022 | A | * | 12/1999 | Eberhard et al. ............... 707/2 |
| 6,021,408 | A | * | 2/2000 | Ledain et al. ................... 707/8 |
| 6,032,160 | A | * | 2/2000 | Lehman ..................... 707/205 |
| 6,052,698 | A | * | 4/2000 | Bennett et al. ............. 707/205 |
| 6,108,653 | A | * | 8/2000 | Pereira .......................... 707/7 |
| 6,115,705 | A | * | 9/2000 | Larson .......................... 707/3 |
| 6,122,664 | A | * | 9/2000 | Boukobza et al. .......... 709/224 |
| 6,144,970 | A | * | 11/2000 | Bonner et al. .............. 707/206 |
| 6,259,448 | B1 | * | 7/2001 | McNally et al. ............ 715/733 |
| 6,269,375 | B1 | * | 7/2001 | Ruddy et al. ............... 707/101 |
| 6,285,996 | B1 | * | 9/2001 | Jou et al. ........................ 707/4 |
| 6,334,134 | B1 | * | 12/2001 | Haderle et al. ............. 707/205 |
| 6,351,850 | B1 | * | 2/2002 | van Gilluwe et al. ....... 717/175 |

(Continued)

*Primary Examiner*—Don Wong
*Assistant Examiner*—Linh Black
(74) *Attorney, Agent, or Firm*—Wong, Cabello, Lutsch, Rutherford & Brucculeri, LLP

(57) ABSTRACT

An improved method and system for controlling free space distribution by key range within a database. In one embodiment, a data structure including key ranges of a plurality of database tables and indexes, and a plurality of key range free space parameters is created. The plurality of database tables and indexes may include a plurality of page sets, which may include rows of data and keys. Time values may be associated with the plurality of free space parameters. The key range free space parameters may have values assigned to them. The key range free space parameters may be user-defined or automatically generated using growth trend analysis, based on key range growth statistics. The rows of data and keys within the plurality of page sets may be redistributed by a reorganization process. The redistributing may reference the key ranges of the data structure and the key range free space parameters.

25 Claims, 6 Drawing Sheets

U.S. PATENT DOCUMENTS

| | | | |
|---|---|---|---|
| 6,411,964 B1 * | 6/2002 | Iyer et al. | 707/200 |
| 6,442,539 B1 * | 8/2002 | Amundsen et al. | 707/2 |
| 6,453,383 B1 * | 9/2002 | Stoddard et al. | 711/112 |
| 6,578,039 B1 * | 6/2003 | Kawamura | 707/100 |
| 6,584,474 B1 * | 6/2003 | Pereira | 707/200 |
| 6,591,269 B1 * | 7/2003 | Ponnekanti | 707/100 |
| 6,606,631 B1 * | 8/2003 | Martin et al. | 707/101 |
| 6,622,142 B1 * | 9/2003 | Murray et al. | 707/100 |
| 6,636,879 B1 * | 10/2003 | Doucette et al. | 707/205 |
| 6,658,437 B1 * | 12/2003 | Lehman | 707/205 |
| 6,668,263 B1 * | 12/2003 | Cranston et al. | 707/205 |
| 2001/0047360 A1 * | 11/2001 | Huras et al. | 707/102 |
| 2002/0083033 A1 * | 6/2002 | Abdo et al. | 707/1 |

* cited by examiner

SYSTEM AND METHOD FOR CONTROLLING FREE SPACE DISTRIBUTION BY KEY RANGE WITHIN A DATABASE

PRIORITY CLAIM

This application claims benefit of priority of provisional application Ser. No. 60/323,412 titled "System And Method For Controlling Free Space Distribution Within A Database" and filed Sep. 19, 2001, whose inventor is John D. Maxfield.

BACKGROUND OF THE INVENTION

1. Field of the Invention

The present invention relates to database utility software, and more particularly to a system and method for controlling free space distribution by key range within a database.

2. Description of the Related Art

Database utility software programs that build table spaces and indexes (e.g., database reorganization, database loading, database recovery, among others) typically apply free space parameters evenly across the entire table space and index. This approach of even distribution may lead to an inefficient use of Direct Access Storage Device (DASD) resources (e.g., allocating too much free space in a section of the table space or index that does not require free space to accommodate growth, or not allocating enough free space in a section of the table space or index that experiences high levels of growth). Unneeded free space allocated to a section of the table space or index may have an impact on performance since more reads may be required to retrieve a given amount of data. Furthermore, disorganization may occur when DB2 attempts to insert or update data within a section of the table space or index that has insufficient free space to accommodate growth.

A table space may contain multiple tables. In this situation, DB2 does not provide the user with the capability to define free space attributes for each table within a given table space. Free space attributes may only be defined for the table space as a whole. Therefore, it is desirable to be able to apply free space to accommodate the free space requirements of each individual table within a multi-table table space.

The current version of REORG PLUS for DB2, a product of BMC Software, Inc., applies free space to a table space during the process of calculating new row identifiers (RIDs) for table space rows during the unload phases. This process is described more fully in U.S. Pat. No. 5,222,235, titled "Databases system for permitting concurrent indexing and reloading of data by early simulating the reload process to determine final locations of the data", whose inventors are Thomas E. Hintz and William R. Cunningham, and which issued on Jun. 22, 1993. U.S. Pat. No. 5,222,235 is hereby incorporated by reference in its entirety as though fully and completely set forth herein.

The RID for each row contains the page number of the page where the row will reside after reorganization. The new RID is written with its corresponding row data to an unload file for processing during the reload phase. During the RID calculation process, free space parameters are applied to keep a portion of each data page free (PCTFREE or percent free) or to insert free pages (FREEPAGE or free page) between data pages. It is noted that the free space parameters are applied at a table space level, rather than at a finer level of granularity within the table space.

The current version of REORG PLUS for DB2 applies free space to indexes in a similar manner. During the unload phase, after the new RID for each row in the file page set has been calculated, REORG PLUS for DB2 extracts the keys for each secondary index and writes them with the new RID to an index work file. During the reload phase, the index work file is sorted by index key. After the sort is complete, free space parameters are applied as index pages and are reloaded with key and RID pairs. The clustering index is rebuilt in a similar manner.

It is desirable that free space settings or parameters allow more granularity (i.e., allow user-defined sub-sections, or key ranges, within a table space or index to be individually controllable through user-defined free space settings or parameters). Thus, using this finer level of granularity than currently available, the user may be able to reduce free space in key ranges of a table or index that do not require free space for insert or update activity (e.g., read-only data), and/or increase free space in key ranges of a table or index that are expected to require new growth (e.g., new database records inserted, existing database records updated). For the foregoing reasons, there is a need for a system and method for controlling free space distribution by key range within a database such that user control of free space settings or parameters within a table or index is achievable.

SUMMARY OF THE INVENTION

The present invention provides various embodiments of an improved method and system for controlling free space distribution by key range within a database.

In one embodiment, a data structure may be created. The data structure may include key ranges of a plurality of database tables and indexes, and free space parameters associated with the key ranges. The plurality of database tables and indexes may include a plurality of page sets (e.g., a file page set, an index page set). The plurality of page sets may include rows of data in a file page set, and keys in an index page set. The key ranges of the plurality of database tables and indexes may include a low key value and a high key value for each of the plurality of database tables and indexes.

The data structure may further include a plurality of key ranges of the plurality of database tables and indexes, and a plurality of free space parameters associated with the key ranges. In one embodiment, one or more time values (e.g., a starting time value, an ending time value) may be associated with the plurality of free space parameters. The plurality of free space parameters may be active during a time frame beginning with a starting time represented by the starting time value and ending with an ending time represented by the ending time value.

The key range free space parameters may have values assigned to them. The key range free space parameters may include, for each key range defined, one or more of: a free page value, a free pages value, a percent free value, an end of key range number of free pages value, or a maximum number of rows value. In one embodiment, the key range free space parameters may be user defined or user specified. In an alternate embodiment, the key range free space parameters may be automatically generated using growth trend analysis, based on key range growth statistics.

The rows of data within the plurality of database tables may be redistributed by a reorganization process. Also, the keys within the plurality of indexes may be redistributed by a reorganization process. The redistributing may reference the key ranges of the data structure and the free space parameters associated with the key ranges.

Additionally, growth within a database may be monitored, using the data structure described above. Statistics regarding key range growth for the plurality of database tables and indexes may be gathered over a user-defined time period. The statistics may be analyzed. Free space parameters may be associated with the key ranges in response to the analysis of the statistics.

BRIEF DESCRIPTION OF THE DRAWINGS

A better understanding of the present invention can be obtained when the following detailed description of various embodiments is considered in conjunction with the following drawings, in which.

Figure 1:
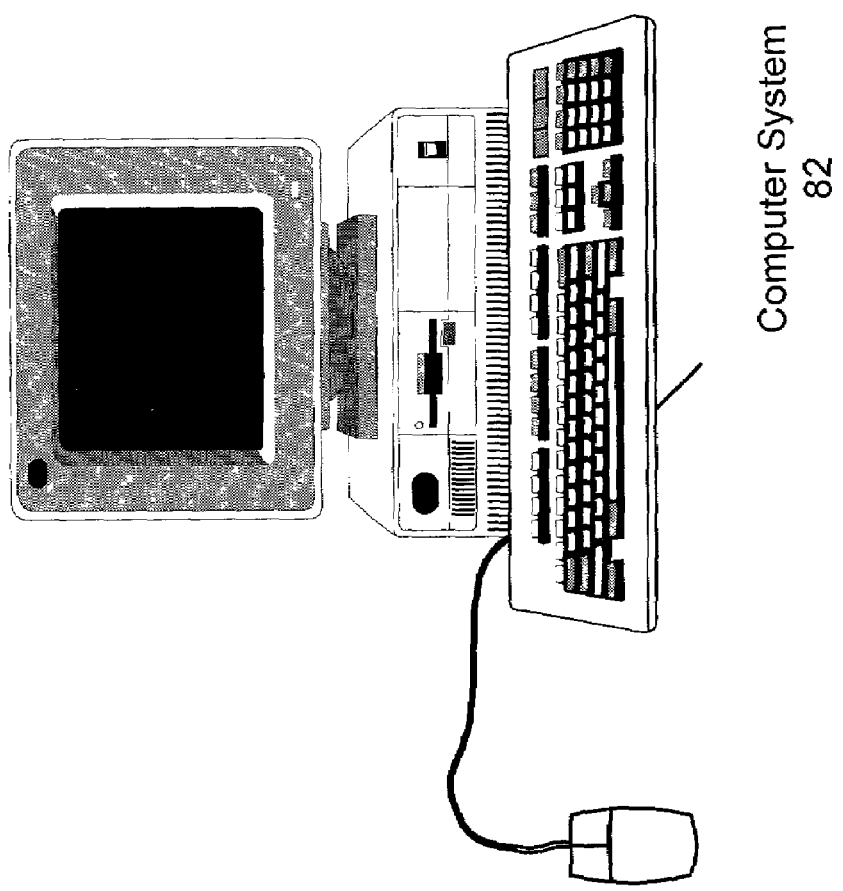
FIG. 1 illustrates an exemplary computer system according one embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

FIG. 1—Computer System

FIG. 1 illustrates a computer system 82 operable to control free space distribution by key range within a database. One embodiment of a method for controlling free space distribution by key range within a database is described below. The computer system 82 may be any type of computer system, including a personal computer system, mainframe computer system, workstation, network appliance, Internet appliance, personal digital assistant (PDA), television system or other device. In general, the term "computer system" can be broadly defined to encompass any device having at least one processor that executes instructions from a memory medium.

In one embodiment, the database may be DB2®(a product of IBM Corporation) and the operating system(s) on which the DB2 database may execute may be OS/1390® and/or z/OS®. (DB2, OS/390 and z/OS are registered trademarks of the IBM Corporation of Armonk, N.Y.) Typically, the OS/390 and z/OS operating systems run on IBM Enterprise Servers (e.g., mainframe computer systems). Alternatively, various other databases and/or operating systems may be used. Thus the management or controlling of free space distribution by key range may be accomplished in various other database management systems, in addition to DB2, in similar manner as described below.

As shown in FIG. 1, the computer system 82 may include a display device operable to display operations associated with controlling free space distribution by key range within a database. The display device may also be operable to display a graphical user interface of controlling free space distribution by key range within a database. The graphical user interface may comprise any type of graphical user interface, e.g., depending on the computing platform.

The computer system 82 may include a memory medium(s) on which one or more computer programs or software components according to one embodiment of the present invention may be stored. For example, the memory medium may store one or more software programs which are executable to perform the methods described herein. Also, the memory medium may store a programming development environment application used to create and/or execute the software programs. The memory medium may also store operating system software, as well as other software for operation of the computer system.

The term "memory medium" is intended to include an installation medium, e.g., a CD-ROM, floppy disks, or tape device; a computer system memory or random access memory such as DRAM, SRAM, EDO RAM, Rambus RAM, etc.; or a non-volatile memory such as a magnetic media (e.g., a hard drive) or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution.

Figure 2:
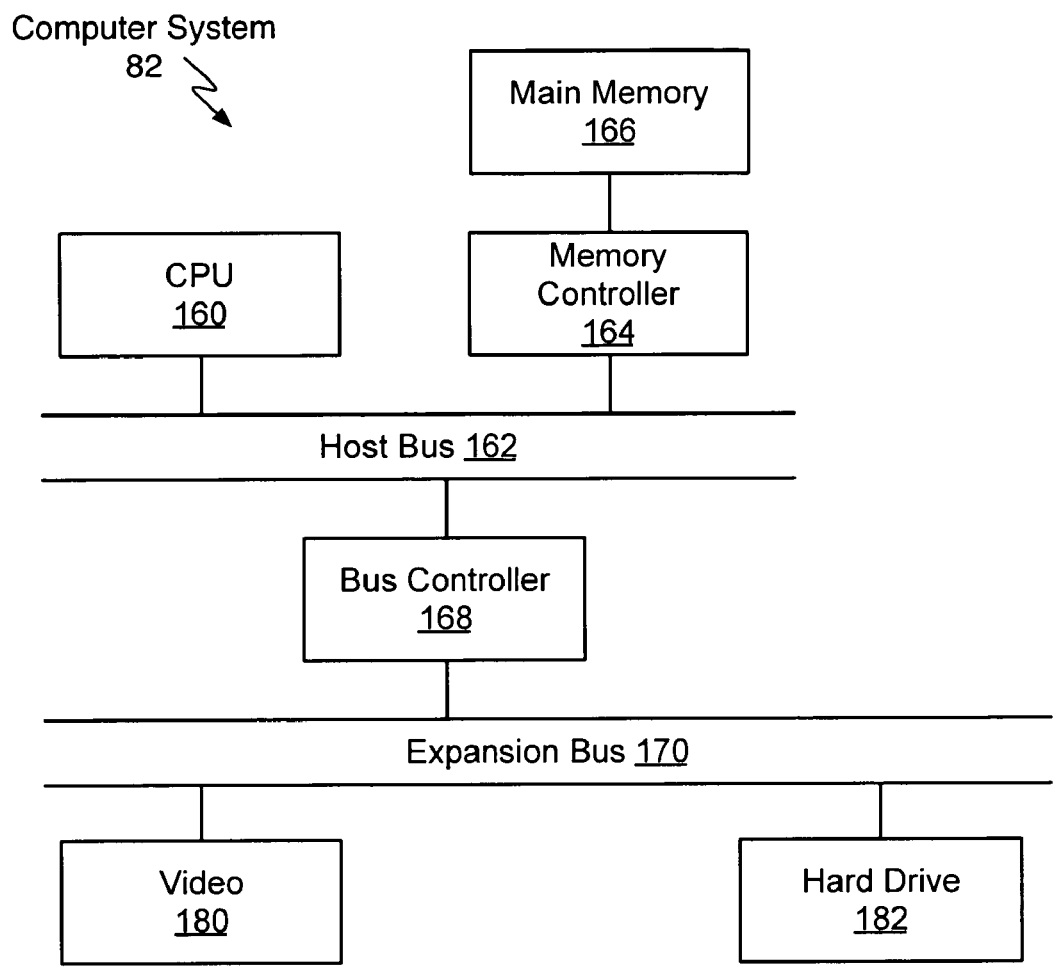
FIG. 2 is an exemplary block diagram of the computer system illustrated in FIG. 1, according to one embodiment of the present invention.

FIG. 2—Computer System Block Diagram

FIG. 2 is an embodiment of an exemplary block diagram of the computer system illustrated in FIG. 1. It is noted that any type of computer system configuration or architecture may be used in conjunction with the system and method described herein, as desired, and FIG. 2 illustrates a representative PC embodiment. It is also noted that the computer system may be a general purpose computer system such as illustrated in FIG. 1, or other types of embodiments. The elements of a computer not necessary to understand the present invention have been omitted for simplicity.

The computer system 82 may include at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others (e.g., mainframe computer systems). Main memory 166 is coupled to the host bus 162 by means of memory controller 164. The main memory 166 may store one or more computer programs or libraries according to the present invention. The main memory 166 also stores operating system software as well as the software for operation of the computer system, as well known to those skilled in the art.

The host bus 162 is coupled to an expansion or input/output bus 170 by means of a bus controller 168 or bus bridge logic. The expansion bus 170 is preferably the PCI (Peripheral Component Interconnect) expansion bus, although other bus types may be used. The expansion bus 170 may include slots for various devices such as a video display subsystem 180 and hard drive 182 coupled to the expansion bus 170, among others (not shown).

Figure 3A:
FIG. 3a illustrates a prior art distribution of data and free space in a sample database table.

FIG. 3a—Prior Art Distribution of Data and Free Space

A prior art distribution of data and free space in a sample database table is shown in FIG. 3a. A user-defined object definition (e.g., a DB2 object definition 300) may specify the layout of data and free space in an existing database table (e.g., in DB2, using a "CREATE TABLESPACE" command). As shown in FIG. 3a, the existing data, as represented by keys 1 through 30, may be evenly distributed within the existing database table. Typically, a user-defined "percent free" variable is set at the table space level that applies to all pages within the table space. In FIG. 3a, although not visible, this "percent free" variable is set to 30 percent. Furthermore, FIG. 3a also illustrates the application of a "free page" variable. Typically in the prior art, the value for a "free page" variable indicates the frequency at which a single page of free space is inserted amongst pages containing data. As shown in FIG. 3a, one page of free space exists or is inserted after every three pages containing data. Thus, the "free page" variable is set to three, in this example.

Figure 3B:
FIG. 3b illustrates a distribution of data and free space in a sample database table, based on user-defined free space parameters, according to one embodiment.

FIG. 3b—One Embodiment of a User-defined Distribution of Data and Free Space

One embodiment of a distribution of data and free space in a sample database table, based on user-defined key range free space parameters, is shown in FIG. 3b. In one embodiment, user-defined key range free space parameters may be provided through Free Space Manager, a product of BMC Software, Inc. A user-defined key range definition (e.g., a Free Space Manager object definition 350) may specify the layout of data and free space in an existing database table (e.g., in Free Space Manager, using a "CREATE KEYRANGESET" command). As shown in FIG. 3b, the existing data, as represented by keys 1 through 30, may be distributed within the existing database table based on user-defined key range free space parameters. For example, user-defined key range free space parameters may include, for each key range defined, one or more of: a free page value, a free pages value, a percent free value, an end of key range number of free pages value, or a maximum number of rows value.

As used herein, a "key range" is a contiguous range of rows within a database table or some other object (e.g., an index), as indicated by a low key and a high key, wherein each key is a unique identifier associated with one or more columns of the database table. In one embodiment, these user-defined free space parameters may be associated with a key range (e.g., two key values: a low key value and a high key value). It is noted that free space values are defined when a table space or index is created. In one embodiment, the free space values defined at table space or index definition time may be used when one or more keys do not fall into a specified key range.

In FIG. 3b, although not visible, the user-defined key range free space parameters are as follows: for the key range beginning with key number 1 through key number 25: a free page value of zero, a free pages value of zero, a percent free value of zero; for the key range beginning with key number 26 through key number 28: a free page value of three, a free pages value of two, a percent free value of 30 percent; for the key number 29 through key number 30: a free page value of zero, a free pages value of zero, a percent free value of zero.

In one embodiment, a "free page" variable may indicate the frequency at which a user-defined number of pages (e.g., a "free pages" variable) of free space is inserted amongst pages containing data. As shown in FIG. 3b for the key range beginning with key number 26 through key number 28, two pages of free space exist or may be inserted after every three pages containing data. Thus, the "free page" variable is set to three, and the "free pages" variable is set to two, for the key range beginning with key number 26 through key number 28, in this example.

In one embodiment, an "end of key range number of free pages" variable may indicate the number of pages of free space inserted after pages containing data for the last key of a given key range. As shown in FIG. 3b, for each of the three key ranges (i.e., the key range beginning with key number 1 through key number 25, the key range beginning with key number 26 through key number 28, and the key number 29 through key number 30), zero pages of free space exist or may be inserted after pages containing data for a given key range. In one embodiment, the "end of key range number of free pages" variable may be applied after the "free pages" variable, thus although two pages of free space are shown after the last key of the key range (i.e., key 28), those two pages of free space may be inserted based upon the "free pages" variable. Alternatively, the order of the application of the "end of key range number of free pages" variable and the "free pages" variable may be reversed, or the "end of key range number of free pages" variable may supersede the "free pages" variable for the last key of a given key range, as the user desires.

Alternatively, a user-defined set of free space distribution values may be defined or set at the object level, as follows: a free page value of zero, a free pages value of zero, a percent free value of zero, among others. In embodiments where a user-defined set of free space distribution values is defined, it would only be necessary for the user to specify, or explicitly define, free space parameters for the single key range beginning with key number 26 through key number 28, to achieve the same effect as specifying free space parameters for each of the three key ranges (i.e., the key range beginning with key 1 through key 25, the key range beginning with key 26 through key 28, the key range beginning with key 29 through key 30).

Comparing the space usage in FIG. 3a with the space usage in FIG. 3b, it may be seen that the amount of space required for keys 1 through 25 and keys 29 and 30 is reduced by one third in FIG. 3b. This reduction is possible due to the finer level of granularity available for setting the user-defined free space parameters by key range, according to one embodiment of the present invention. In FIG. 3a, a user-defined "percent free" variable is set at the object level to 30 percent across all keys; no mechanism exists to specify different "percent free" values for one or more key ranges. In FIG. 3b, a corresponding percent free value may be set on any size key range (e.g., for a single key, or for multiple consecutive keys). Thus, data which is to be read-only (i.e., no growth), may have their "percent free" values set to zero, which in turn leads to read-only keys taking up a minimum amount of space.

In one embodiment, the user may be provided with the capability to manage free space within a table or index, based on user-defined key range specifications. The user may be able to tune free space within a page set based on the needs of the application. For example, if a user determines that a given key range within the table has no insert or update activity (i.e., read-only data), free space may be removed from the key range to improve query performance. This may require fewer reads to retrieve the data for the key range since the key range occupies fewer pages with free space removed.

Additionally, the user may pre-position free space in key ranges that are expected to have high insert and/or update activity. Thus, the user may minimize disorganization caused by insert and/or update activity by pre-positioning free space in certain key ranges. This minimization of disorganization may, in turn, reduce the need for reorganizations and improve database performance.

The user may improve performance of a reload utility software program by removing unneeded free space within a given page set. For example, if page set storage requirements are reduced, fewer I/O operations may be required by the utility during the reload process. This may result in a shorter elapsed time for the reload to complete processing, as compared to traditional utility executions. It is noted that this improvement in performance may apply equally well to any other database maintenance programs (e.g., other utility software programs), in addition to "reload" utility software programs. Performance improvements related to improved free space management may not be exclusive to "utility software programs" or "database maintenance software programs". More importantly, reduced I/O requirements may benefit other DB2 operations (e.g., SELECT, INSERT, and UPDATE processes) which are used by application programs.

Figure 4:
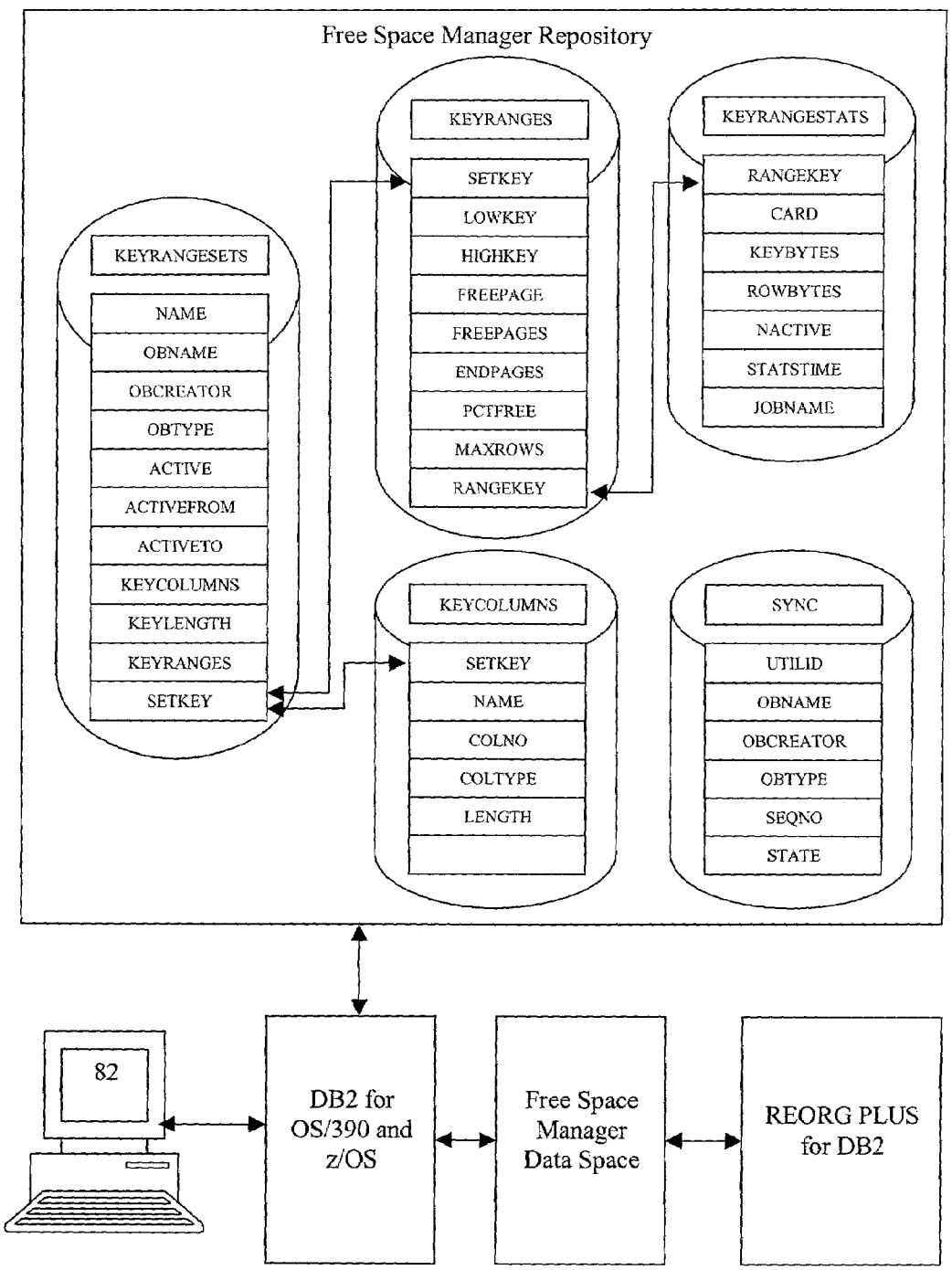
FIG. 4 illustrates a free space manager repository, according to one embodiment.

FIG. 4—One Embodiment of a Free Space Manager Repository

One embodiment of a Free Space Manager Repository is shown in FIG. 4. The components and data flow of the Free Space Manager Repository are shown interacting with a REORG PLUS for DB2 table space reorganization process (shown at the bottom of FIG. 4). It is noted that the Free Space Manager Repository may interact with various other processes, as desired. A detailed description of one embodiment of the components of the Free Space Manager Repository (i.e., tables: Key Range Sets, Key Ranges, Key Columns, Key Range Statistics, Sync) appears below. Various embodiments may use different combinations of columns than those specified below for each of the tables within the free space manager repository (i.e., certain of the specified columns below may be replaced with other columns, or deleted entirely; additional columns may also be added), and/or different tables, as desired, as long as the modifications, equivalents, and/or alternative table layouts fall within the spirit and scope of the present invention as defined by the appended claims.

In one embodiment of the present invention, the REORG PLUS for DB2 product of BMC Software, Inc. is enhanced, to allow for a finer level of control of free space within the table. Thus, prior to calculating RIDs for each row of the file page set during the unload phase, REORG PLUS for DB2 may search a key range table to determine the key range that the row is associated with. Portions of the sort data record key field, which contains the clustering index key value, may be used as the search criteria. Other search criteria may be substituted, as desired.

Similarly, prior to placing keys and RIDs on new index pages during the reload phase, REORG PLUS for DB2 may search a key range table to determine the key range that the index key is associated with. Portions of the unload data record key field (e.g., for clustering indexes) and index work record key field (e.g., for secondary indexes), which contain the index key values, may be used as the search criteria. Other search criteria may be substituted, as desired.

Each element of the key range table may contain free space parameters for a key range. These parameters may take effect for all rows that fall within the key range. When a set of rows or keys do not fall within a key range specified in the key range table, the default free space parameters defined for the object (e.g., table space or index) may take effect.

In one embodiment, the first row or key to enter a key range scope may be positioned on a new page within the page set. As rows or keys come in and out of key range scope, this may cause a "key range break" condition, which may result in the creation of a new page when a new key range is encountered. When a new key range is encountered, the user may have the option of choosing to have the new key range parameters take effect when the next page is processed.

The user may control free space for both tables and indexes on a key range basis. For tables and clustering indexes, the user may control free space for key ranges based on any combination of columns, as chosen by the user. For example, in order to closely match the sort order of the data, the user may desire to specify key ranges using a subset of the key columns that comprise the clustering index key. By specifying the columns in index key column sequence, the sort order of the data may be closely matched.

One benefit of specifying key ranges using a subset of the key columns that comprise the clustering index key is that "key range breaks" may occur much less frequently than if the key ranges were specified without regard to this concern. When "key range breaks" are minimized, free space is typically distributed efficiently and DASD resources are conserved. In the case of secondary indexes, typically, the index is the only data that is available for searching the key range table, thus the user-specified key range may be limited to a subset of the key columns that comprise the clustering index key.

The user may define the key ranges they want to control and the free space parameters that apply to each of the key ranges. The key range may be defined in terms of a low key value and high key value. These key values may be stored in the repository and retrieved by a utility (e.g., the REORG PLUS for DB2 product). In one embodiment, where the database is DB2, the retrieval may use DB2 internal format, thus allowing the utility to retrieve and use the key range specifications with no additional processing. The key value stored in the repository may be compared directly to the key values stored in the utility data records. An appropriate user interface (e.g., a graphical user interface, a batch program) may be used to accept the user specifications. The user specifications may be stored in a Free Space Manager Repository table, as shown in FIG. 4.

The user interface may provide the following functions, among others: (i) register an object for free space management; (ii) activate or deactivate free space management for an object; (iii) fetch, insert, update, and delete Key Range Sets; (iv) fetch, insert, update, and delete Key Columns; (v) fetch, insert, update, and delete Key Range Specifications.

The user may manage the contents of the Free Space Manager Repository, through the use of the user interface. Referential integrity within the Free Space Manager Repository may be managed by the database itself (e.g., DB2) in order to relieve the user interface of some of the information management burden.

Multiple sets of key range specifications may be entered for a single object (e.g., a database table or an index). Similarly, multiple sets of key range specifications may be entered for multiple objects (e.g., a plurality of database tables and/or indexes). The user may specify a time frame in which the key range specifications are active for a utility process. Thus, the user may pre-position key range specifications for reorganizations to take place at some designated time in the future (e.g., after normal working hours).

During the utility initialization phase, the utility may query the Free Space Manager Repository tables to perform the following tasks: (i) determine if the object being reorganized is registered for free space management; (ii) determine if free space management is active for the object; (iii) retrieve key columns; (iv) retrieve key ranges.

In one embodiment, a Free Space Manager Data Space may be used to store the key ranges for an object in memory for reference during utility processing. This data space may be used to minimize the use of memory within the utility's address space. A key range specification may be retrieved from the key range specifications in the data space and stored in the utility's address space only when it is needed for reference during the utility's processing of a given key range.

In an embodiment utilizing a relational database (e.g. a DB2 database), the Free Space Manager Repository may include a number of relational tables and indexes, as shown in FIG. 4. Typically one Free Space Manager (FSM) Repository may be used per subsystem (e.g., a DB2 subsystem). Example relational tables, including possible columns for the relational tables and a description of the purpose of each relational table, are described below. It is noted that these example relational tables may be modified (e.g., column names, column purposes), and in some cases eliminated entirely, in various embodiments. Similarly, additional relational tables may be used, either as additions to the relational tables noted below, or as substitutions for one or more of these example relational tables, as desired by the user.

A Key Range Sets table with columns: name, obname, obcreator, obtype (e.g., table or index), active (e.g., yes or no), activefrom (e.g., a time or timestamp value), activeto (e.g., a time or timestamp value), keycolumns, keylength, keyranges, and setkey (e.g., a primary key for association with the Key Ranges and Key Columns tables), may be used to store a list of tables and/or indexes that have one or more sets of key range specifications. In one embodiment, the setkey column may yield a unique identifier for a row in the Key Range Sets table. Thus, the primary key for the Key Range Sets table may be the setkey column. In one embodiment, a unique key may be generated in the form of a time or timestamp value for the purposes of linking rows of the Key Range Sets table, the Key Ranges table, and the Key Columns table together.

During utility initialization, the utility (e.g., the REORG PLUS for DB2 product) may query the Key Range Sets table to determine if free space management for the object is active for the current execution of the utility. This may be done by finding rows, based on the current date and time, that fall within a time frame defined by the activefrom and the activeto columns. If a row is found, additional information may be retrieved from the other repository tables to implement free space management.

A Key Columns table with columns: setkey (e.g., a foreign key for association with the Key Range Sets table), name (e.g., column name), column number (e.g., numeric position of the column in the table), column type (e.g., character, decimal, integer), length, may be used to define the key to be used for free space management. It is noted that the foreign key (i.e., column setkey) may be defined with ON DELETE CASCADE so that all dependent rows of the Key Columns table may be deleted when its parent Key Range Sets row is deleted.

In one embodiment, during utility initialization, the key columns may be retrieved from the free space manager repository, stored in memory, and linked to their corresponding table and index utility control blocks. The utility may validate key columns at utility initialization time. The data in the Key Columns table may be compared to columns defined for the object being processed to determine where there is any disparity that might affect processing.

A Key Ranges table with columns: setkey (e.g., a foreign key for association with the Key Range Sets table), lowkey, highkey, freepage (e.g., number of pages containing data to be produced before a page of free space is produced), freepages (e.g., number of free pages to be produced when the free page interval is reached), endpages (e.g., number of free pages to be produced when the end of the key range is encountered), percent free (e.g., percentage of each page to be left as free space), maximum number of rows (e.g., a maximum number of rows per page), and rangekey (e.g., a primary key for association with the Key Range Statistics table) may be used to control the allocation of free space within the object. It is noted that the foreign key (i.e., column setkey) may be defined with ON DELETE CASCADE so that all dependent rows of the Key Ranges table may be deleted when its parent Key Range Sets row is deleted.

In one embodiment, the rangekey column may yield a unique identifier for a row in the Key Ranges table. Thus, the primary key for the Key Ranges table may be the rangekey column. In one embodiment, a unique key may be generated in the form of a time or timestamp value for the purposes of linking rows of the Key Ranges table and the Key Range Statistics table together.

In one embodiment, during utility initialization, the key range specifications may be retrieved from the free space manager repository, stored in memory, and linked to their corresponding table and index utility control blocks. As data for the file page sets and index page sets are processed, the key range specifications may be referenced to control free space distribution within the object. If a key range specification is not found for a given set of rows or keys, the object-defined free space parameters may be applied.

A Key Range Statistics table with columns: rangekey (e.g., a foreign key for association with the Key Ranges table), card (e.g., number of rows in the key range), keybytes (e.g., number of bytes occupied by the keys in the key range), rowbytes (e.g., number of bytes occupied by the rows in the key range), nactive (e.g., number of pages occupied by the rows of the key range), statstime (e.g., time when these statistics were gathered), and jobname (e.g., name of the job that gathered theses statistics), may be used to collect statistics for the key ranges defined for the object. It is noted that the foreign key (i.e., column rangekey) may be defined with ON DELETE CASCADE so that all dependent rows of the Key Range Statistics table may be deleted when its parent Key Ranges row is deleted.

In one embodiment, during utility execution, as data for the tables and/or indexes are processed, and the key range specification for each key is found, the number of bytes for the row and key, and the number of rows, may be accumulated and stored in memory for each key range. At utility termination, these key range statistics may be written to the Key Range Statistics table in the Free Space Manager Repository.

In one embodiment, prior to utility execution, all of the key range statistics for an object may be retrieved from the free space manager repository, stored in memory, and acted upon by a growth trend analysis process. This growth trend analysis process may recommend and adjust free space specifications in the Key Ranges table for the object, based on key range growth patterns.

A Sync table with columns: utilid, obname, obcreator, obtype (e.g., table or index), seqno (e.g., a sequence number for the row within a group of rows comprising the state of the Key Range Set information for an object), state (e.g., the state of the Key Range Set), may be used to store the state of the Key Range Set for a given utility execution.

In one embodiment, in the event that a utility should fail, the Sync table may be referenced to retrieve the Key Range Set information that was being used by the utility prior to failure. By storing the state of the Key Range Set for a given utility execution, the Key Range Set information that the utility started with is protected from change in the event of a utility failure. Furthermore, the Key Range Set for an object may be modified by the user without affecting the Key Range Set specifications that are in use by a concurrently executing utility. Even if the utility should fail, the original Key Range Set specifications remain when the utility is restarted.

Figure 5:
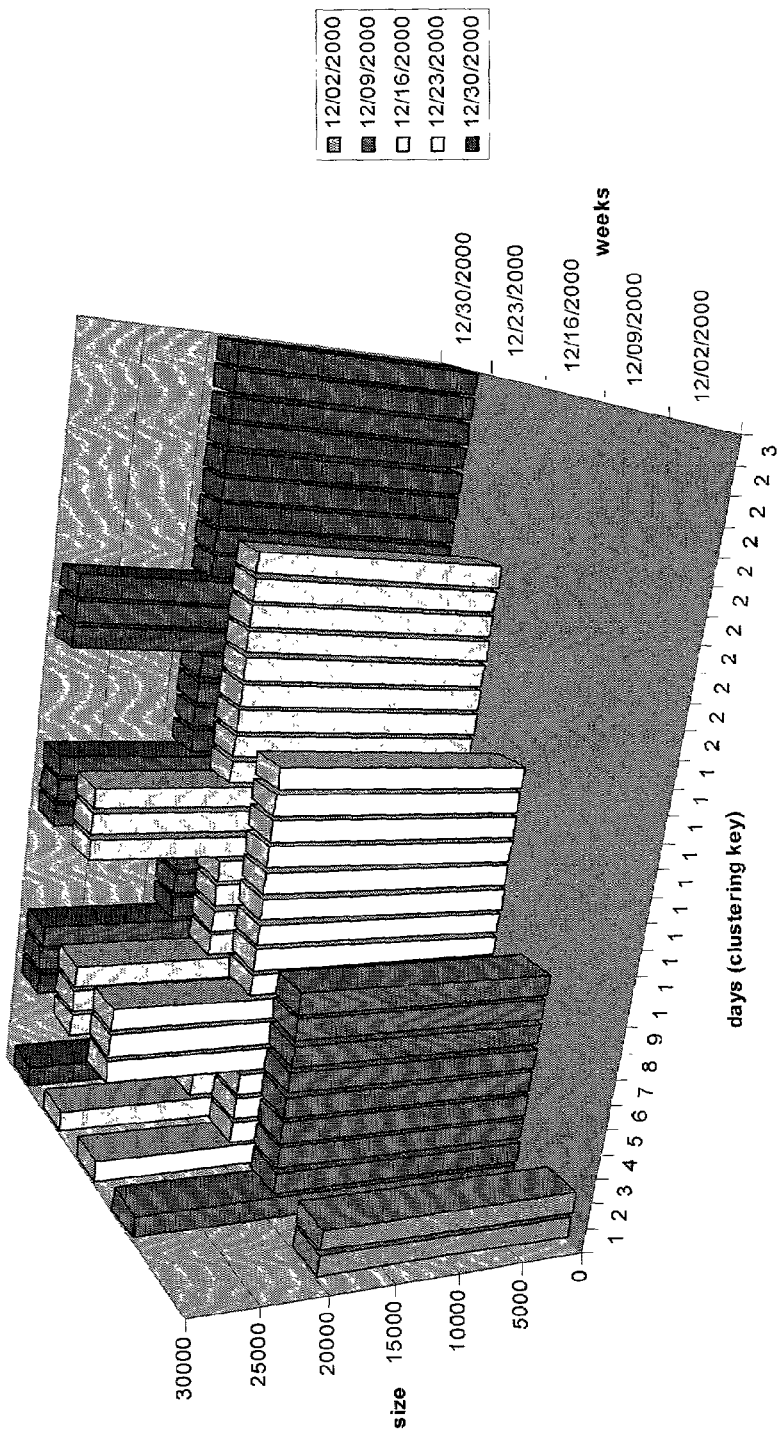
FIG. 5 is a bar chart illustrating a sample scenario of object growth by key range over time, according to one embodiment.

FIG. 5—A Sample Scenario

FIG. 5 is a bar chart illustrating a sample scenario of object growth by key range over time, according to one embodiment. These object growth patterns may be useful in determining how to distribute free space automatically.

A railroad company may lease its rail cars for use in shipping. The railroad company may store data related to its leased rail cars in a rail car accounting system. A waybill table (e.g., a part of the rail car accounting system) may contain status information for the rail cars. The bar charts in FIG. 5 may be constructed from data stored in the waybill table. The waybill table data in the page set may be clustered by day. Each of the five samples shown in FIG. 5 may represent the page set after one week of activity. The Y-axis in the chart (i.e., Size) may represent the number of rows inserted or updated in the waybill table. New waybills may be added in new key ranges by date, thus causing horizontal (i.e., X-axis) growth of the page set. Additional rows may be added to existing key ranges, or updates may occur to previous waybills, causing vertical (i.e., Y-axis) growth behind the horizontal growth of the page set. It is noted that some key ranges may have no growth. Key range statistics may provide information to: (i) reduce free space in key ranges that are "read-only" (i.e., have no growth); (ii) increase free space in key ranges that are expected to have insert and/or update activity.

Figure 6:
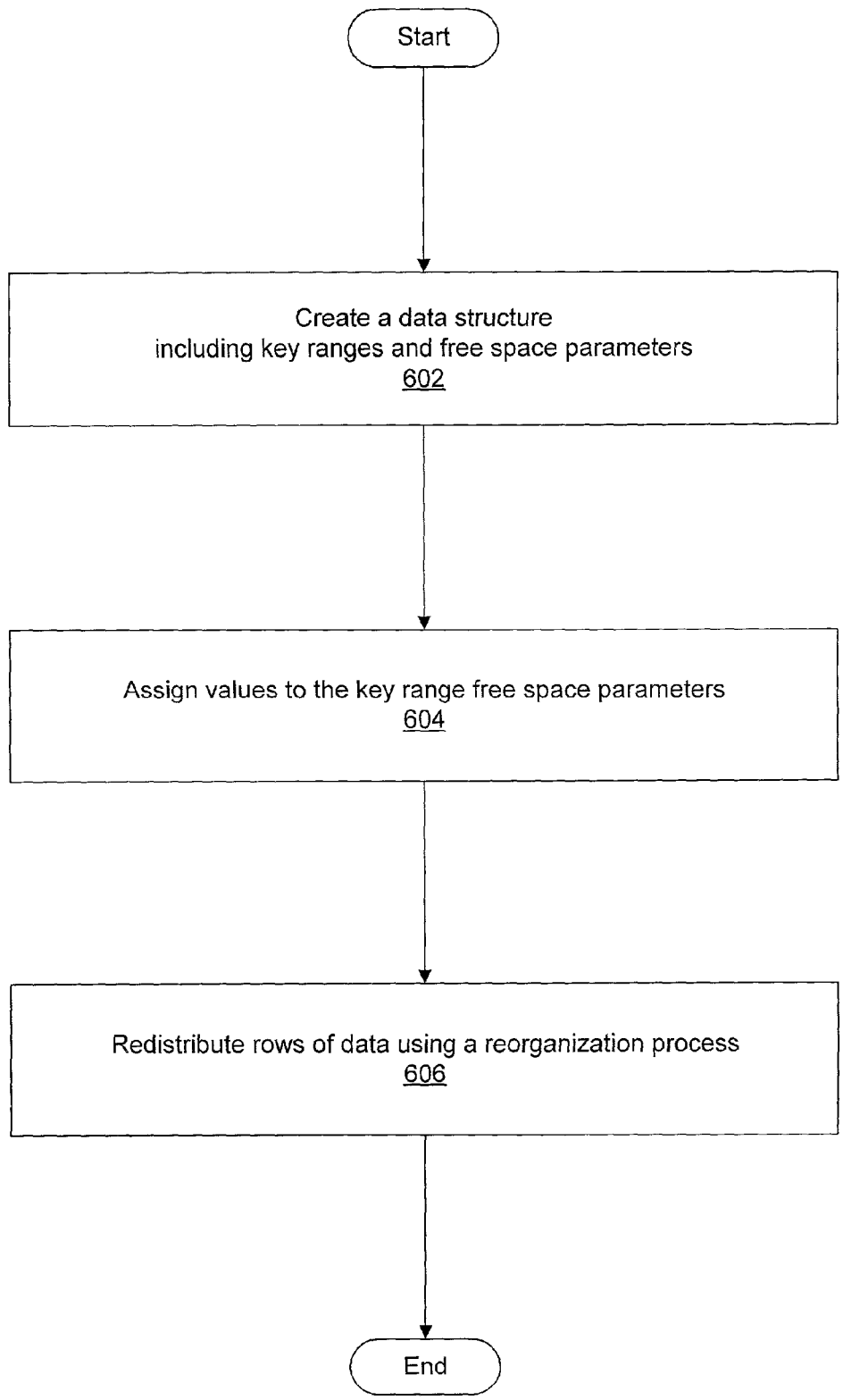
FIG. 6 is a flow chart illustrating a system and method for controlling free space distribution by key range within a database, according to one embodiment.

FIG. 6—Controlling Free Space Distribution by Key Range Within a Database

FIG. 6 is a flow chart illustrating a system and method for controlling free space distribution by key range within a database, according to one embodiment.

As shown in step 602, a data structure may be created. The data structure may include key ranges of a plurality of database tables and indexes, and free space parameters associated with the key ranges. The plurality of database tables and indexes may include a plurality of page sets (e.g., a file page set, an index page set). The plurality of page sets may include rows of data and keys. The key ranges of the plurality of database tables and indexes may include a low key value and a high key value for each of the plurality of database tables.

The data structure may further include: a plurality of key ranges of the plurality of database tables and indexes, and a plurality of free space parameters associated with the key ranges. In one embodiment, one or more time values (e.g., a starting time value, an ending time value) may be associated with the plurality of free space parameters. The plurality of free space parameters may be active during a time frame beginning with a starting time represented by the starting time value and ending with an ending time represented by the ending time value.

In step 604, the key range free space parameters may have values assigned to them. The key range free space parameters may include, for each key range defined, one or more of: a free page value, a free pages value, a percent free value, an end of key range number of free pages value, or a maximum number of rows value. In one embodiment, the key range free space parameters may be user-defined or user specified. In an alternate embodiment, the key range free space parameters may be automatically generated using growth trend analysis, based on key range growth statistics.

In step 606, the rows of data within the plurality of page sets of the plurality of database tables and indexes may be redistributed by a reorganization process. The redistributing may reference the key ranges of the data structure and the free space parameters associated with the key ranges.

Additionally, growth within a database may be monitored, using the data structure described above. Statistics regarding key range growth for the plurality of database tables and indexes may be gathered over a user-defined time period. The statistics may be analyzed. Free space parameters may be associated with the key ranges in response to the analysis of the statistics.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A database free space management method, comprising:
    identifying a first range of key values associated with a first set of rows in a database file;
    assigning first values to each of a plurality of free space management parameters associated with the first range of key values;
    identifying a second range of key values associated with a second set of rows in the database file;
    assigning second values to each of a plurality of free space management parameters associated with the second range of key values;
    managing free space associated with the first set of rows in accordance with the first values; and
    managing free space associated with the second set of rows in accordance with the second values,
    wherein the second values differ from the first values by at least one free space management parameter value, thereby producing non-uniform distribution of free space in the database file.

2. The method of claim 1, wherein the first set of rows are associated with a first table in the database file and the second set of rows are associated with a second table in the database file.

3. The method of claim 1, wherein the act of identifying a first range of key values comprises identifying a first key value and a second key value, wherein the first range of key values defines a contiguous range of rows as indicated by the first key value and the second key value.

4. The method of claim 3, wherein the act of identifying a second range of key values comprises identifying a third key value and a fourth key value, wherein the second range of key values defines a contiguous range of rows as indicated by the third key value and the fourth key value.

5. The method of claim 1, wherein one or more of the free-space management parameters are selected from the group consisting of "free page value," "free pages value," "percent free value," "end of key range number of free pages" and "maximum number of rows."

6. The method of claim 1, wherein the act of assigning first values to each of a plurality of free space management parameters comprises accepting user input for at least one of the first values.

7. The method of claim 6, wherein the act of assigning second values to each of the plurality of free space management parameters comprises accepting user input for at least one of the second values.

8. The method of claim 1, wherein the first set of rows in the database file comprise rows in a data table or an index.

9. The method of claim 1, wherein the second set of rows in the database file comprise rows in a data table or an index.

10. The method of claim 1, wherein the first sets of rows and the second set of rows comprise rows from a single table.

11. A program storage device, readable by a programmable control device, comprising instructions stored thereon for causing the programmable control device to:
    identify a first range of key values associated with a first set of rows in a database file;
    assign first values to each of a plurality of free space management parameters associated with the first range of key values;
    identify a second range of key values associated with a second set of rows in the database file;
    assign second values to each of a plurality of free space management parameters associated with the second range of key values;
    manage free space associated with the first set of rows in accordance with the first values; and
    manage free space associated with the second set of rows in accordance with the second values,
    wherein the second values differ from the first values by at least one free space management parameter value, thereby producing non-uniform distribution of free space in the database file.

12. The program storage device of claim 11, wherein the instructions to identify a first range of key values comprise instructions to identify a first key value and a second key value, wherein the first range of key values defines a contiguous range of rows as indicated by the first key value and the second key value.

13. The program storage device of claim 12, wherein the instructions to identify a second range of key values comprise instructions to identify a third key value and a fourth key value, wherein the second range of key values defines a contiguous range of rows as indicated by the third key value and the fourth key value.

14. The program storage device of claim 1, wherein the instructions to:
    identify the first range of key values associated with the first set of rows in the database file, comprise instructions to identify rows from a first table; and
    identify the second range of key values associated with the second set of rows in the database file, comprise instructions to identify rows from a second table.

15. The program storage device of claim 14, wherein the first table comprises a data table or an index and the second table comprises a data table or an index.

16. The method of claim 1, wherein the database file is a page set.

17. The program storage device of claim 11, wherein the database file is a page set.

18. A database free space management method, comprising:
    designating a first set of rows of a file object with a first range of key values;
    designating a second set of rows of the file object with a second range of key values; and
    non-uniformly distributing free space within the first and second sets of rows of the file object by distributing free space differently for the first range of key values than for the second range of key values.

19. The method of claim 18, wherein the file object is selected from the group consisting of a page set, a table within a database file, and a plurality of tables in a database file.

20. The method of claim 18, wherein the act of non-uniformly distributing free space within the first and second sets of rows of the same file abject by distributing free space differently for the first range of key values than for the second range of key values comprises:
    assigning first values to each of a plurality of free space management parameters associated with the first range of key values for the first set of rows; and
    managing free space associated with the first set of rows in accordance with the first values.

21. The method of claim 20, wherein the act of non-uniformly distributing free space within the first and second sets of rows of the same file object by distributing free space differently for the first range of key values than for the second range of key values comprises:
    assigning second values to each of a plurality of free space management parameters associated with the second range of key values for the second set of rows, wherein the second values differ from the first values by at least one free space management parameter value; and
    managing free space associated with the second set of rows in accordance with the second values.

22. A program storage device, readable by a programmable control device, comprising instructions stored thereon for causing the programmable control device to:
    designate a first set of rows of a file object with a first range of key values;
    designate a second set of rows of the same file object with a second range of key values; and
    distribute free space differently for the first range of key values than for the second range of key values to non-uniformly distribute free space within the first and second sets of rows of the same file object.

23. The program storage device of claim 22, wherein the file object is selected from the group consisting of a page set, a table within a database file, and a plurality of tables in a database file.

24. The program storage device of claim 22, wherein to distribute free space differently for the first range of key values than for the second range of key values to non-uniformly distribute free space within the first and second sets of rows of the same file object, the instructions cause the programmable control device to:

assign first values to each of a plurality of free space management parameters associated with the first range of key values forte first set of rows; and manage free space associated with the first set of rows in accordance with the first values.

25. The program storage device of claim 24, wherein to distribute free space differently for the first range of key values than for the second range of key values to non-uniformly distribute free space within the first and second sets of rows of the same file object, the instructions cause the programmable control device to:

assign second values to each of a plurality of free space management parameters associated with the second range of key values for the second set of rows, wherein the second values differ from the first values by at least one free space management parameter value; and manage free space associated with the second set of rows in accordance with the second values.

\* \* \* \* \*